US007931881B2

(12) United States Patent
Abrams et al.

(10) Patent No.: US 7,931,881 B2
(45) Date of Patent: Apr. 26, 2011

(54) INTEGRATED BOILER AND AIR POLLUTION CONTROL SYSTEMS

(75) Inventors: Richard F. Abrams, Westborough, MA (US); Mark R. Lewis, Woonsocket, RI (US); Jeffrey Penterson, Putnam, CT (US)

(73) Assignee: Babcock Power Environmental Inc., Worcester, MA (US)

( * ) Notice: Subject to any disclaimer, the term of this patent is extended or adjusted under 35 U.S.C. 154(b) by 0 days.

(21) Appl. No.: 12/567,070

(22) Filed: Sep. 25, 2009

(65) Prior Publication Data

US 2011/0076215 A1    Mar. 31, 2011

(51) Int. Cl.
B01D 53/34 (2006.01)
B01D 53/56 (2006.01)
B01D 53/62 (2006.01)
B01D 53/72 (2006.01)
B01D 53/74 (2006.01)

(52) U.S. Cl. .......... 423/210; 423/215.5; 423/239.1; 423/245.3; 423/247; 422/168; 422/169; 422/170; 422/171; 422/177; 422/180; 110/205; 431/11

(58) Field of Classification Search .......... 423/210, 423/215.5, 239.1, 247, 245.3; 422/168–171, 422/177, 180; 110/205; 431/11
See application file for complete search history.

(56) References Cited

U.S. PATENT DOCUMENTS

| | | | |
|---|---|---|---|
| 3,579,296 A * | 5/1971 | Cann | 423/243.02 |
| 4,205,630 A * | 6/1980 | Regan | 122/1 R |
| 4,572,110 A | 2/1986 | Haeflich | |
| 4,592,293 A * | 6/1986 | Toyama et al. | 110/347 |
| 4,602,673 A | 7/1986 | Michelfelder et al. | |
| 4,793,981 A | 12/1988 | Doyle et al. | |
| 4,925,633 A | 5/1990 | Doyle | |
| 5,024,171 A | 6/1991 | Krigmont et al. | |
| 5,029,535 A | 7/1991 | Krigmont et al. | |
| 5,118,282 A | 6/1992 | Reynolds et al. | |
| 5,129,331 A | 7/1992 | Merritt et al. | |
| 5,165,903 A | 11/1992 | Hunt et al. | |
| 5,268,089 A | 12/1993 | Avidan et al. | |
| 5,339,621 A | 8/1994 | Tolman | |
| 5,868,082 A | 2/1999 | Hunter | |
| 5,937,652 A | 8/1999 | Abdelmalek | |
| 6,282,901 B1 | 9/2001 | Marin et al. | |

(Continued)

FOREIGN PATENT DOCUMENTS

DE    30 45 106 A1 *  12/1981

*Primary Examiner* — Timothy C Vanoy
(74) *Attorney, Agent, or Firm* — Edwards Angell Palmer & Dodge LLP; Joshua L. Jones

(57) ABSTRACT

An air pollution control system includes an emission treatment system configured to receive flue gas, to reduce at least one pollutant therefrom, and to output emission treated flue gas. A first air heater in fluid communication with the emission treatment system includes a heat exchanger for heating forced air introduced thereto above a base temperature and thereby cooling emission treated flue gas from the emission treatment system to a stack discharge temperature. A second air heater in fluid communication with the first air heater to receive heated forced air therefrom includes a heat exchanger for heating forced air introduced thereto to a preheat temperature for combustion in a boiler and thereby cooling flue gas introduced from a boiler to the second air heater to an emission treatment temperature. The second air heater is in fluid communication with the emission treatment system to introduce cooled flue gas thereto.

35 Claims, 2 Drawing Sheets

U.S. PATENT DOCUMENTS

| | | |
|---|---|---|
| 6,568,185 B1 | 5/2003 | Marin et al. |
| 6,863,523 B2 * | 3/2005 | Giella .......................... 431/11 |
| 7,062,912 B2 | 6/2006 | Penfornis et al. |
| 7,294,321 B2 | 11/2007 | Abrams |
| 7,494,625 B2 | 2/2009 | Abrams |
| 2005/0260761 A1 | 11/2005 | Lanier et al. |
| 2008/0175774 A1 | 7/2008 | Morrison et al. |
| 2008/0317652 A1 | 12/2008 | Bono et al. |
| 2009/0107111 A1 | 4/2009 | Oliver |
| 2009/0130011 A1 | 5/2009 | Abrams et al. |

* cited by examiner

INTEGRATED BOILER AND AIR POLLUTION CONTROL SYSTEMS

BACKGROUND OF THE INVENTION

1. Field of the Invention

The present invention relates to air pollution control, and more particularly, to treating flue gas to reduce pollutant emission therefrom.

2. Description of Related Art

A variety of devices are known in the art for controlling pollution in exhaust and flue gas, for example, flue gas emitted from boilers. Among such devices, many are directed to reduction of $NO_X$, CO, VOC, and the like, from flue gas prior to releasing the flue gas into the atmosphere. For years, a commonly employed technique for reducing $NO_X$, CO, and VOC emissions was to modify the combustion process itself, e.g., by flue gas recirculation or the overfire air. However, in view of the generally poor proven results of such techniques (i.e., $NO_X$ removal efficiencies of 50% or less), recent attention has focused instead upon various flue gas denitrification processes (i.e., processes for removing nitrogen from flue gas prior to the flue gas being released into the atmosphere).

Flue gas denitrification processes are categorized into so-called "wet" methods, which utilize absorption techniques, and "dry" methods, which instead rely upon adsorption techniques, catalytic decomposition and/or catalytic reduction. At present, a widely implemented denitrification process is selective catalytic reduction (SCR), which is a "dry" denitrification method whereby the introduction of a reactant (e.g., $NH_3$) causes reduction of the $NO_X$, which, in turn, becomes transformed into harmless reaction products, e.g., Nitrogen and water. The reduction process in an SCR process is typified by the following chemical reactions:

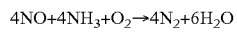

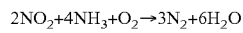

Oxidation catalysts can be used to cause oxidation of carbon monoxide (CO) and/or so-called volatile organic compounds (VOCs). An exemplary oxidation catalyst is a precious metal oxidation catalyst. CO/VOC oxidizing catalysts can operate without reagent using unreacted oxygen in the flue gas to convert CO to $CO_2$ according to the following reaction:

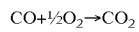

Due to the technology involved in SCR, there is some flexibility in deciding where to physically site the equipment for carrying out the SCR process. In other words, the chemical reactions of the SCR process need not occur at a particular stage or locus within the overall combustion system. The two most common placement sites are within the midst of the overall system (i.e., on the "hot side" upstream from the air heater), or at the so-called "tail end" or low dust portion of the overall system (i.e., on the "cold side" downstream from the air heater).

Unfortunately, significant problems are encountered in industrial settings with respect to both hot side and cold side SCR installations. For example, hot side SCR processes are not optimal for use in conjunction with wood-fired burners. This is because ash present within the wood contains alkalis, which can cause damage to the catalyst due to poisoning during the SCR process. Cold side SCR processes avoid this disadvantage because the particulate matter is removed prior to reaching the catalyst, but are plagued by thermal inefficiency due to their reliance on indirect heat exchangers.

Use of SCR systems in biomass-fueled plants requires locating the SCR system after the particulate control device to limit the SCR catalyst's exposure to damaging compounds carried in the flue gas, such as alkaline metal (Na, K, etc.) compounds. To minimize the damage from these compounds, SCR systems in biomass-fueled plants are typically located at the 'tail end' of the plant where the flue gas temperature is in the range of 280° F. to 380° F. In this low temperature range SCR systems need heat input from some auxiliary source, typically from a gas-fired and/or oil-fired burner(s), to raise the temperature of the flue gas to a temperature range, typically 430° F. to 600° F., that allows sufficient SCR catalyst activity. However, the additional heat input must be recovered to minimize the impact of the SCR system on the plant's efficiency. Two approaches for an SCR system in a biomass-fueled plant have been used, as described below.

First, a conventional 'tail end' SCR system uses an auxiliary heat input device, such as burners or steam coils in the flue gas duct to raise the flue gas temperature prior to the SCR catalyst. A recovery heat exchanger (a recuperator) recovers only 60% to 70% of the auxiliary heat input (limited by exponentially rising costs for greater recovery) typically by transferring heat from the flue gas stream exiting the SCR to the flue gas stream before the auxiliary heat input device. In addition to its low heat recovery, a conventional 'tail-end' SCR system requires significant additional fan power, typically a booster fan, to overcome pressure drop through the SCR catalyst and the recovery heat exchanger.

A second alternative is regenerative SCR (RSCR) technology that integrates auxiliary heat input and heat recovery (regenerative thermal media) into a compact, modular SCR system to recover over 95% of the heat needed to raise the flue gas temperature for the SCR catalyst. RSCR technology is proven to be more cost efficient and effective $NO_X$ control technology than a conventional 'tail end' SCR system.

Such conventional methods and systems generally have been considered satisfactory for their intended purpose. Nonetheless, there is an ongoing need in the art for improved performance. For example, while the RSCR technology is superior to a conventional 'tail end' SCR, it still requires at least some auxiliary heat input. There still remains a need in the art for systems and methods that can reduce or eliminate the need for auxiliary heat input. There also remains a need in the art for such systems and methods that can reduce the pressure drop through pollution control systems. The present invention provides a solution for these problems.

SUMMARY OF THE INVENTION

The subject invention is directed to a new and useful air pollution control system. The system includes an emission treatment system configured to receive flue gas, to reduce at least one pollutant therefrom to convert flue gas into emission treated flue gas. A first air heater is in fluid communication with the emission treatment system. The first air heater includes a heat exchanger that is configured to heat forced air introduced thereto above a base temperature and to thereby cool emission treated flue gas from the emission treatment system introduced to the heat exchanger of the first air heater to a stack discharge temperature. A second air heater is in fluid communication with the first air heater to receive heated forced air therefrom. The second air heater includes a heat exchanger configured to heat forced air introduced thereto to a preheat temperature for combustion in a boiler and to thereby cool flue gas introduced from a boiler to the heat exchanger of the second air heater to an emission treatment temperature. The second air heater is in fluid communication with the emission treatment system to introduce cooled flue gas thereto.

In accordance with certain embodiments, a first air circuit is defined through the first and second air heaters for supplying preheated undergrate air to a boiler, and a second air circuit is defined through the first and second air heaters for supplying preheated overfire air to a boiler. The first air circuit can include a forced draft fan in fluid communication with the first air heater for forcing air through the first air circuit to a boiler, and the second air circuit can include an overfire air fan in fluid communication with the first air heater for forcing air through the second air circuit to a boiler.

It is also contemplated that the emission treatment system can include a selective catalytic reduction system configured and adapted to reduce $NO_X$ from flue gas in the emission treatment system. The emission treatment system can include an electrostatic precipitator, a fabric filter, or any other suitable component for reducing particulate matter from flue gas in the emission treatment system. It is also contemplated that the emission treatment system can include a catalytic CO control system for oxidizing CO from flue gas in the emission treatment system, and/or a catalytic VOC control system for oxidizing VOC from flue gas in the emission treatment system. The emission treatment system can include a multi-pollutant catalytic reactor configured to reduce multiple pollutants from flue gas in the emission treatment system.

In accordance with certain embodiments, the first air heater can be configured and adapted to cool flue gas entering at an inlet temperature in a range of about 360° F. to about 500° F. to an outlet temperature in a range of about 280° F. to about 350° F. The first air heater can be configured to cool flue gas to a temperature of about 320° F. The first air heater can be configured to heat air entering at a temperature in a range of about 60° F. to about 100° F., for example ambient air temperature, to a temperature in a range of about 250° F. to about 300° F. It is contemplated that the first air heater can be configured to heat air entering at a temperature of about 70° F. to a temperature of about 270° F.

It is also contemplated that the second air heater can be configured to cool flue gas entering at a temperature in a range of about 550° F. to about 650° F. to a temperature in a range of about 360° F. to about 500° F. The second air heater can be configured to cool flue gas to a temperature of about 450° F. The second air heater can configured to heat air entering at a temperature in a range of about 250° F. to about 300° F. to a temperature in a range of about 475° F. to about 550° F. For example, the second air heater can be configured to heat air entering at a temperature of about 270° F. to a temperature of about 500° F.

The invention also provides an air pollution control system. The system includes an emission treatment system configured to reduce at least one pollutant from flue gas received into the emission treatment system at a temperature in a range of about 360° F. to about 500° F. and to output emission treated flue gas from the emission treatment system at a temperature in a range of about 360° F. to about 500° F.

In certain embodiments, the emission treatment system includes a multi-pollutant catalytic reactor. The emission treatment system can include a dust collection system upstream of the multi-pollutant catalytic reactor. The dust collection system is configured and adapted to reduce dust from flue gas flowing to the multi-pollutant catalytic reactor. The multi-pollutant catalytic reactor can include a $NO_X$ reducing catalyst upstream from a CO oxidizing catalyst. The emission treatment system can include a component upstream of the multi-pollutant catalytic reactor for reducing particulate matter from flue gas flowing to the multi-pollutant catalytic reactor, wherein the component is an electrostatic precipitator, a fabric filter, or any other suitable component. The emission treatment system can include an injection system configured to inject a reducing agent such as ammonia into flue gas flowing through the emission treatment system for $NO_X$ reduction in the multi-pollutant catalytic reactor.

It is also contemplated that a first heater can be used in addition to or in lieu of the first air heater. The first heater includes a heat exchanger configured to heat forced fluid introduced thereto above a base temperature and to thereby cool emission treated flue gas from the emission treatment system introduced to the heat exchanger of the first heater to a stack discharge temperature. The heat exchanger of the first heater can be configured to exchange heat between water and emission treated flue gas.

The invention also provides a method of treating flue gas to reduce air pollution. The method includes the steps of introducing air into a heat exchanger of a first air heater, wherein the heat exchanger of the first air heater is configured to transfer heat between flue gas and air, and heating the air introduced into the heat exchanger of the first air heater by cooling emission treated flue gas introduced into the heat exchanger of the first air heater. The method also includes introducing air from the heat exchanger of the first air heater into a heat exchanger of a second air heater, wherein the heat exchanger of the second air heater is configured to transfer heat between flue gas and air, and heating the air introduced into the heat exchanger of the second air heater by cooling flue gas from a boiler introduced into the heat exchanger of the second air heater. The method includes steps of introducing cooled flue gas from the heat exchanger of the second air heater to an emission treatment system and reducing at least one pollutant from flue gas introduced into the emission treatment system from the second air heater. The method also includes introducing emission treated flue gas from the emission treatment system into the heat exchanger of the first air heater, and discharging cooled emission treated flue gas from the heat exchanger of the first air heater.

In certain embodiments, the steps of introducing air, heating air, introducing cooled flue gas, reducing at least one pollutant, introducing emission treated flue gas, and discharging cooled emission treated flue gas are all performed continuously. The method can further include the steps of introducing heated air from the heat exchanger of the second air heater into a boiler for combustion, and introducing flue gas from the boiler into the heat exchanger of the second air heater.

It is contemplated that the step of introducing air into the heat exchanger of the first air heater can include introducing air from a first fan into a first air circuit and introducing air from a second fan into a second air circuit. The step of heating the air introduced into the first air heater can include heating air in the first and second air circuits separately. The step of introducing air into the heat exchanger of the second air heater can include introducing air from the first and second air circuits separately. The step of heating the air introduced into the second air heater can include heating air in the first and second air circuits separately. The method can further include a step of introducing air in the first and second air circuits separately from the second heat exchanger into a boiler.

In accordance with certain embodiments, the method further includes reducing dust content from flue gas in the emission treatment system. A step can be included for reducing particulate matter content from flue gas passing through the emission treatment system, wherein the step of reducing particulate matter content includes passing flue gas through a component for reducing particulate matter from flue gas in the emission treatment system selected from the group consisting of an electrostatic precipitator, a fabric filter, or any other suitable component.

The method can include reducing $NO_X$ from flue gas passing through the emission treatment system, wherein the step of reducing $NO_X$ includes passing flue gas through a selective catalytic reduction system. A step can be included for oxidizing CO from flue gas passing through the emission treatment system, wherein the step of oxidizing CO includes passing flue gas through a catalytic CO control system. It is also contemplated that a step can be included for oxidizing VOC from flue gas passing through the emission treatment system, wherein the step of oxidizing VOC includes passing flue gas through a catalytic VOC control system. The method can include reducing multiple pollutants from flue gas passing through the emission treatment system, wherein the step of reducing multiple pollutants includes passing flue gas through a multi-pollutant catalytic reactor.

It is contemplated that the step of heating air introduced into the first air heater can include cooling flue gas entering the heat exchanger of the first air heater at a temperature in a range of about 360° F. to about 500° F. to a temperature in a range of about 280° F. to about 350° F. The step of cooling flue gas entering the heat exchanger of the first air heater can include cooling the flue gas to a temperature of about 320° F. The step of heating the air introduced into the first air heater can include heating air entering the heat exchanger of the first air heater at a temperature in a range of about 60° F. to about 100° F. to a temperature in a range of about 250° F. to about 300° F. For example, the step of heating the air introduced into the first air heater can include heating air entering the heat exchanger of the first air heater at a temperature of about 70° F. to a temperature of about 270° F.

The step of heating air introduced into the second air heater can include cooling flue gas entering the heat exchanger of the second air heater at a temperature in a range of about 550° F. to about 650°, for example about 600° F., to a temperature in a range of about 360° F. to about 500° F. The step of cooling flue gas entering the heat exchanger of the second air heater can include cooling the flue gas to a temperature of about 450° F. The step of heating the air introduced into the second air heater can include heating air entering the heat exchanger of the second air heater at a temperature in a range of about 250° F. to about 300° F. to a temperature in a range of about 475° F. to about 550° F. For example, the step of heating the air introduced into the second air heater can include heating air entering the heat exchanger of the second air heater at a temperature of about 270° F. to a temperature of about 500° F.

In accordance with certain embodiments, the step of reducing at least one pollutant includes introducing flue gas into the emission treatment system at a temperature in a range of about 360° F. to about 500° F. and discharging emission treated flue gas from the emission treatment system at a temperature in a range of about 360° F. to about 500° F., wherein the emission treatment system includes a multi-pollutant catalytic reactor configured to reduce multiple pollutants from flue gas in the emission treatment system. The step of reducing at least one pollutant can include reducing $NO_X$ and oxidizing CO from a flue gas flow entering the multi-pollutant catalytic reactor at a temperature in a range of about 360° F. to about 500° F. The step of reducing at least one pollutant can include reducing $NO_X$ and oxidizing CO from a flue gas flow entering the multi-pollutant catalytic reactor at a temperature in a range of about 400° F. to about 450° F.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
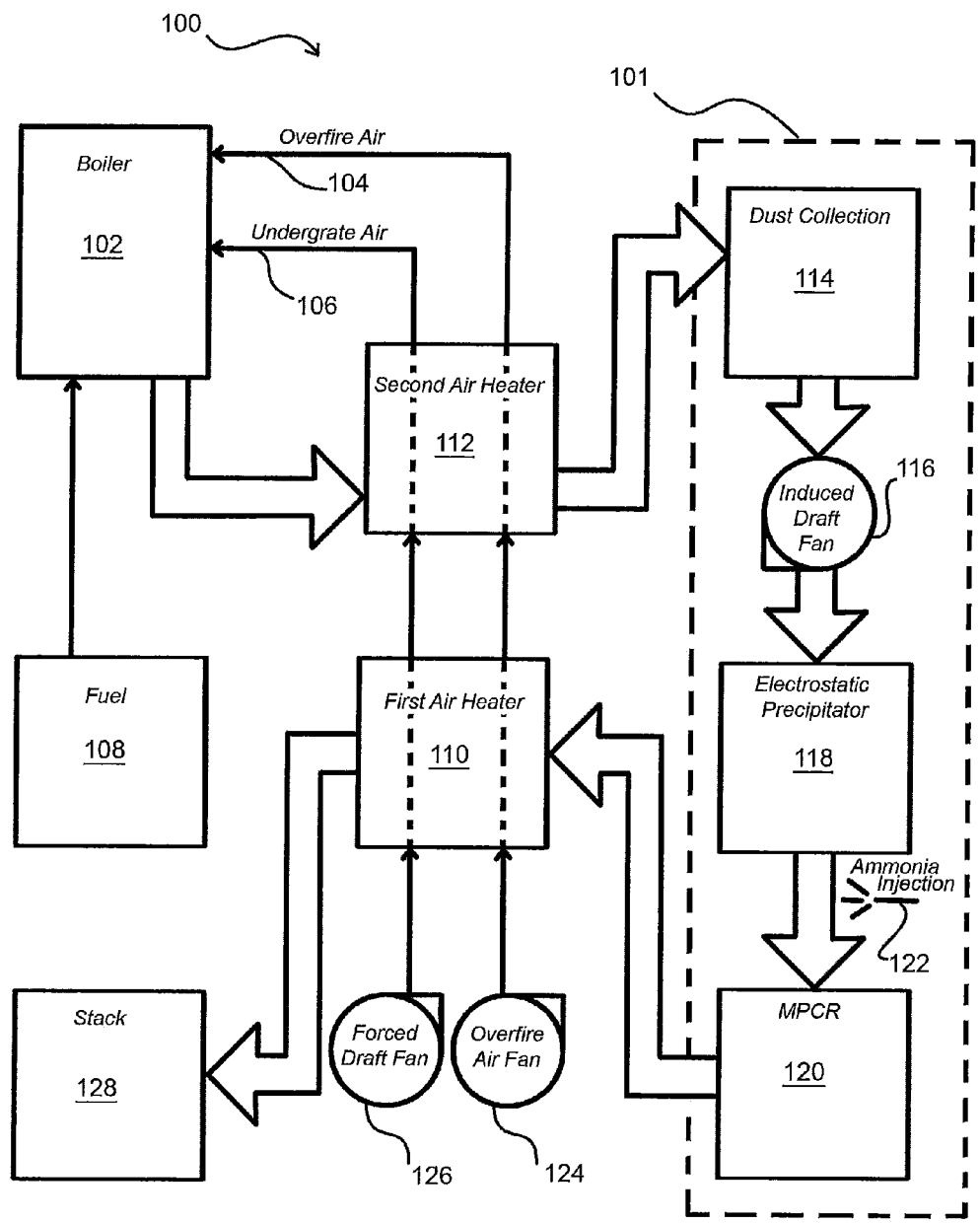
FIG. 1 is a schematic view of an exemplary embodiment of an air pollution control system constructed in accordance with the present invention, showing the overfire and undergrate air circuits and the circuit of the flue gas through the heat exchangers and emission treatment system.

Reference will now be made to the drawings wherein like reference numerals identify similar structural features or aspects of the subject invention. For purposes of explanation and illustration, and not limitation, a partial view of an exemplary embodiment of the air pollution control system in accordance with the invention is shown in FIG. 1 and is designated generally by reference character 100. Other embodiments of air pollution control systems in accordance with the invention, or aspects thereof, are provided in FIG. 2, as will be described. The systems and methods of the invention can be used to reduce air pollution and increase thermal efficiency for power and/or heat plants fueled by biomass fuels and/or other fuels, for example.

Referring now to FIG. 1, system 100 includes a boiler 102, which can be a stoker such as a Riley Advanced Stoker™, available from Riley Power Inc. of Worcester, Mass., for example. The boiler could instead be a fluidized bed boiler, a bubbling fluidized bed boiler, a gasification boiler, or any other suitable type of boiler. An emission treatment system 101 receives cooled flue gas from boiler 102 and reduces at least one pollutant therefrom to convert cooled flue gas into emission treated flue gas. The individual components of emission treatment system 101 will be discussed in greater detail below.

A first air heater 110 is in fluid communication with emission treatment system 101. First air heater 110 includes a heat exchanger that heats forced air introduced by forced draft fan 126 and overfire air fan 124 from a relatively low temperature, e.g., ambient air temperature, to an elevated temperature. The air introduced by fans 124 and 126 typically has a temperature in a range of about 60° F. and about 100° F., e.g., ambient temperature in many applications, and this air is typically heated to a temperature in a range of between about 250° F. and about 300° F. The benefit of a cold fan is lower power consumption compared to the conventional configuration. For example, the air introduced by fans 124 and 126 can have a temperature around 70° F., and this air can be heated in the heat exchanger of first air heater 110 to a temperature around 270° F. The heat for this process is provided by emission treated flue gas received by first air heater 110 from emission treatment system 101. The heat exchanger of first air heater 110 thereby cools the emission treated flue gas from emission treatment system 101 to a stack discharge temperature. For example, emission treated flue gas can be introduced from emission treatment system 101 to first air heater 110 at a temperature in the range of about 360° F. to about 500° F. The heat exchanger of first air heater 110 can cool the emission treated flue gas to a temperature cool enough to discharge from stack 128, for example, to a temperature in the range of about 280° F. to about 350° F., such as about 320° F. In FIG. 1, the flow of emission treated flue gas though into and out of first air heater 110 is represented schematically by the large arrows, and the flow of air from fans 124 and 126 into and out of first air heater 110 is represented by the narrow arrows.

Fans 124 and 126 are advantageously sized to provide sufficient pressure drop handling capacity to move the needed air flows through the two air heaters 110 and 112 to the points of use for the heated air flows. Typically, overfire air fan 124 can have more than twice the pressure drop handling capacity of forced draft fan 126, and the amount of air flow is about the same through both fans 124 and 126. Unlike a conventional boiler, both of the air-moving fans 124 and 126 draw ambient temperature air, typically air from outdoors, and push it through each of the air heaters 110 and 112. Compared to a conventional boiler, in which a forced draft fan typically pushes all the air flow through a conventional air heater unit (sufficient air flow for the undergrate air and overfire air requirements) and the overfire air fan boosts the pressure of a portion of the heated air from the conventional air heater unit, the air-moving fans 124 and 126 in the split air heater design have lower power requirements, which reduce plant operating costs, and, particularly for forced draft fan 126.

A second air heater 112 is in fluid communication with first air heater 110 to receive heated forced air therefrom. Second air heater 112 includes a heat exchanger configured to heat forced air introduced thereto to a preheat temperature for combustion in a boiler 102 and to thereby cool flue gas introduced from boiler 102, from the boiler's economizer(s), for example, to the heat exchanger of second air heater 112 to an emission treatment temperature. Second air heater 112 is in fluid communication with emission treatment system 101 to introduce cooled flue gas thereto. In FIG. 1, the flow of flue gas into and out of second air heater 112 is schematically represented by the broad arrows, and the flow of forced air into and out of second air heater 112 is represented by the narrow arrows. The amounts of heat transferred to the air streams in first air heater 110 and second air heater 112 are similar to the amount of heat transferred in a conventional air heater.

Flue gas can be introduced from boiler 102 to second air heater 112 at a temperature in the range of about 550° F. to about 650° F., and can cool the flue gas to a temperature in the range of about 360° F. to about 500° F. For example, second air heater 112 can cool flue gas entering from boiler 102, at a temperature of about 600° F. to an outlet temperature of about 450° F. About 360° F. to about 500° F. is a suitable temperature range for introduction to emission treatment system 101. With respect to the forced air, second air heater 112 can heat air entering at a temperature in the range of about 250° F. to about 300° F. to an outlet temperature in the range of about 475° F. to about 550° F. For example, second air heater 112 can heat air entering at a temperature of about 270° F. to a temperature of about 500° F. Thus the forced air passing through both air heaters 110 and 112 is significantly preheated before reaching boiler 102, which enhances thermal efficiency.

With continued reference to FIG. 1, system 100 maintains two separate forced air circuits. A first air circuit 106 is defined through first and second air heaters 110 and 112 for supplying preheated undergrate air to a boiler 102. A second air circuit 104 is defined through first and second air heaters 110 and 112 for supplying preheated overfire air to boiler 102. First air circuit 106 includes forced draft fan 126 in fluid communication with first air heater 110 for forcing air through first air circuit 106 to boiler 102. Second air circuit 104 includes overfire air fan 124 in fluid communication with first air heater 110 for forcing air through second air circuit 104 to boiler 102.

The flue gas stream exits second air heater 112 in the temperature range of about 360° F. to about 500° F., so that there is sufficient catalyst activity in the SCR system for $NO_X$ reduction and, if necessary, CO and/or VOC oxidation. In a system with a conventional air heater, such a high range of flue gas exit temperature would indicate low plant efficiency, because typically there is no effective means to recoup the remaining useful heat to the plant. The arrangement of first air heater 110 in the split air heater design efficiently and economically recovers the remaining useful heat from the flue gas.

With continued reference to FIG. 1, emission treatment system 101 includes a dust collection system 114, an induced draft fan 116, an electrostatic precipitator 118, an ammonia injection system 122, and a multi-pollutant catalytic reduction system (MPCR) 120. Dust collection system 114 is located upstream of the other components of emission treatment system 101 in order to reduce dust from the flue gas prior to entering the rest of emission treatment system 101, where dust would otherwise be problematic. Dust collection system 114 can include a mechanical collector used to receive the flue gas stream from second air heater 112 and remove a portion of the particulate matter in the flue gas stream, typically the coarser fraction of particulate matter, and to discharge the flue gas stream with a lower, but finer, particulate matter concentration to the plant's induced draft fan 116.

Induced draft fan 116 moves the flue gas stream through the system components and connecting ductwork—drawing flue gas from boiler 102 through the economizer(s), through second air heater 112, and through dust collection system 114 and pushing flue gas through electrostatic precipitator 118, MPCR 120 (including CO catalyst if present), and first air heater 110. Compared to a plant with an RSCR or a conventional 'tail-end' SCR system, the split air heater and SCR system arrangement of system 100 eliminates the need for a booster fan in the flue gas stream and requires less overall fan power to move the flue gas. Even though the flue gas enters induced draft fan 116 at a temperature higher than in a conventional plant, which requires more fan power on an equal basis, due to lower pressure drop through the flue gas path, particularly in the SCR portion of the arrangement, there is an overall reduction in flue gas fan power required. The location of induced draft fan 116, whether upstream or downstream of electrostatic precipitator 118, is not critical although it is advantageous for induced draft fan 116 to be upstream to maintain the positive pressure for electrostatic precipitator 118. Those skilled in the art will readily appreciate that dust collection system 114 and induced draft fan 116 can include any typical components for their respective purpose, and may be removed or substituted for any other systems suitable for a given application.

Electrostatic precipitator 118 reduces particulate matter from the flue gas prior to the flue gas entering MPCR 120 to a very low particulate matter concentration. For example, electrostatic precipitator 118 can be used to control the particulate matter emissions to levels of around 0.010-0.012 lb/MBtu. While the temperature of the flue gas flowing through electrostatic precipitator 118 is higher than in a conventional plant and would indicate a larger volume electrostatic precipitator to accommodate the higher volumetric flue gas flow, the amount of electrostatic precipitator volume increase, if any, and the associated equipment cost is relatively small. Those skilled in the art will readily appreciate that in lieu of, or in addition to electrostatic precipitator 118, a fabric filter, or any other suitable component for reducing particulate matter from flue gas in the emission treatment system may be used without departing from the spirit and scope of the invention.

Emission treatment system 101 receives flue gas from second air heater 112 at a temperature in a range of about 360° F. to about 500° F., for example, which is a temperature range suitable for typical dust collection, induced draft fan, particulate reduction, and catalytic reduction systems. Emission treatment system 101 outputs emission treated flue gas to first air heater 110 at a temperature in a range of about 360° F. to about 500° F., for example, which is hot enough to still include significant heat that can be recovered in first air heater 110, as described above.

In the ductwork connecting the outlet of electrostatic precipitator 118 to the inlet of the SCR system, an ammonia injection system 122 including one or more ammonia injection nozzles is provided to ensure that the proper amount of ammonia is added to the flue gas to achieve the desired level of $NO_X$ reduction with the $NO_X$ catalyst in MPCR 120 while minimizing or reducing the amount of ammonia that slips, unreacted, through MPCR 120. As is typical in an RSCR system, the ammonia is injected as very small droplets of aqueous ammonia produced by one or more air atomizing nozzles positioned in the ductwork and setup to ensure that the aqueous ammonia is vaporized and well-mixed with the flue gas stream.

Figure 2:
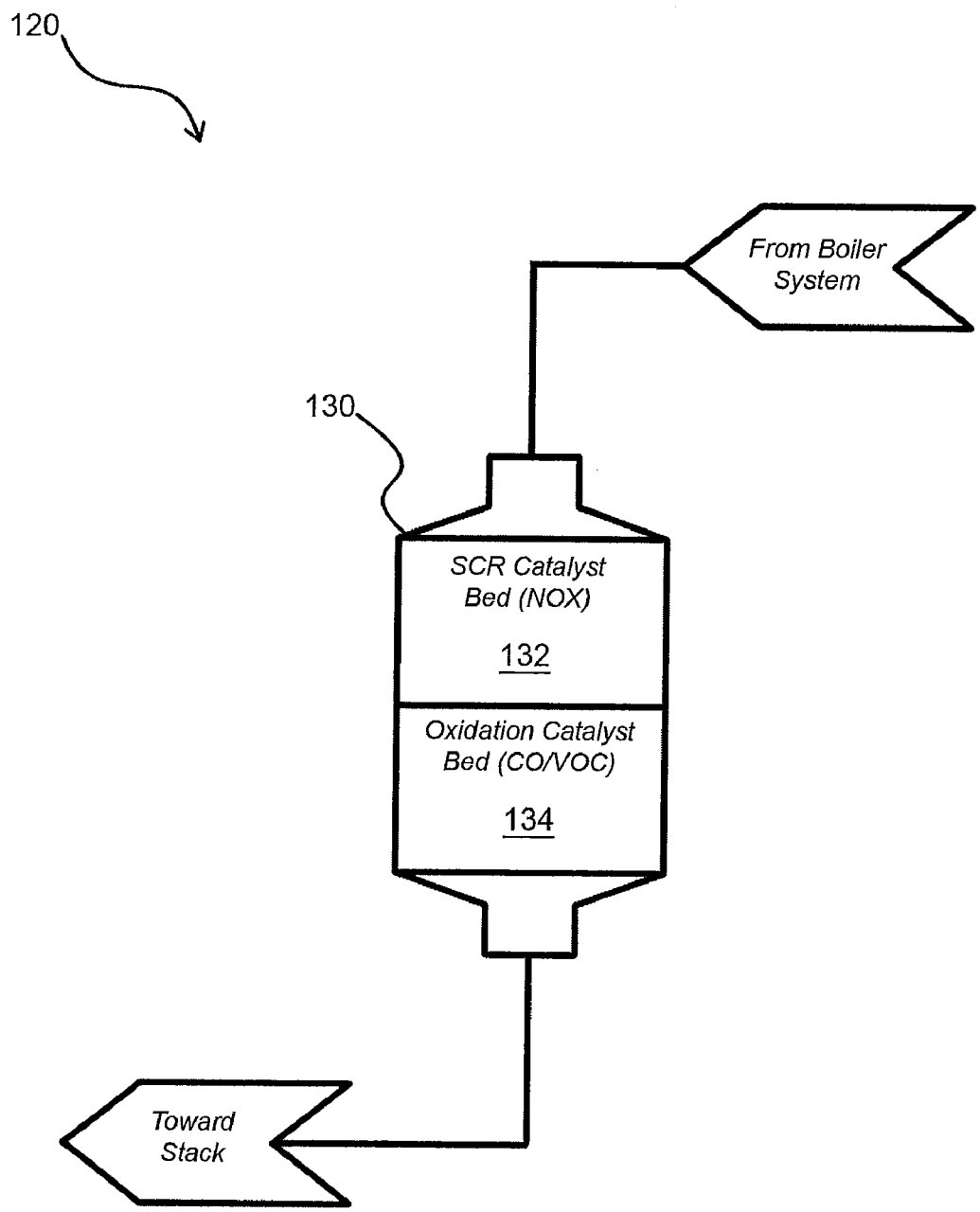
FIG. 2 is a schematic view of an exemplary embodiment of a multi-pollutant catalytic reactor constructed in accordance with the present invention, showing catalyst beds for reducing multiple pollutants from flue gas.

Referring now to FIG. 2, MPCR 120 is shown in greater detail. MPCR 120 includes a chamber 130 containing a catalyst bed 132 for selective catalytic reduction of $NO_X$ and a catalyst bed 134 for oxidation of CO, which also can be used to oxidize VOC. Catalyst bed 132 for $NO_X$ reduction is located upstream from catalyst bed 134 for CO/VOC oxidation. This allows ammonia injected upstream of MPCR 120 (see, e.g. ammonia injection system 122 in FIG. 1) to be used first for $NO_X$ reduction, and the remaining ammonia can be oxidized along with CO/VOC prior to being sent to stack 128, thereby reducing the amount of ammonia slip from system 100. Suitable catalysts for $NO_X$ reduction and CO/VOC oxidation are described in U.S. Pat. No. 7,294,321 to Abrams, U.S. Pat. No. 7,494,625 to Abrams, and U.S. Patent Application Publication No. 2009/0130011 to Abrams et al., each of which is incorporated by reference herein in its entirety.

With continued reference to FIG. 2, flue gas enters MPCR 120 as indicated by the arrow labeled "From Boiler System" and treated flue gas is discharged from MPCR 120 as indicated by the arrow labeled "Toward Stack". While MPCR 120 is shown including catalyst beds for both $NO_X$ and CO/VOC, those skilled in the art will readily appreciate that one or the other can be omitted, and that any other suitable type of catalyst bed can be substituted without departing from the spirit and scope of the invention. While FIG. 2 shows only one chamber 130, those skilled in the art will readily appreciate that any suitable number, size, and valving scheme can be used for chambers in specific applications without departing from the spirit and scope of the invention. For example, multiple chambers 130 could be used in parallel if appropriate for a given application.

MPCR 120 receives flue gas, low in particulate matter concentration, from the electrostatic precipitator 118, passes the flue gas, with its well-mixed and appropriate amount of ammonia, over a sufficient amount of SCR catalyst, and if necessary, passes the flue gas, with little ammonia slip, over a sufficient amount of precious metal catalyst to oxidize a portion of the carbon monoxide (CO) in the flue gas stream, and discharges the flue gas stream, still at a relatively high temperature, to the flue gas inlet of first air heater 110. It is also possible for MPCR 120 to include a heat exchanger that efficiently transfers the useful heat in the high temperature flue gas in the SCR system to a plant's feedwater stream or other liquid stream. This recovers the energy from the flue gas to the feedwater, thus maintaining the efficiency of system 100, and can typically be used in lieu of a first air heater such as first air heater 110, but can also be used in addition to a first air heater, depending on the specific application.

The CO oxidation catalyst of MPCR 120 utilizes precious metals such as platinum and palladium. The higher the temperature of the flue gas encountering the catalyst is, the lower the concentration of the precious metals is required. There is a tradeoff between higher operating temperatures and lower catalyst costs. Analysis has shown that the lower the operating temperature for MPCR 120, the lower the overall equipment cost. There are certain thresholds that must be overcome for the catalysts to operate together and produce high removal efficiencies. System 100 incorporates this development to produce a fully integrated boiler and emissions control system 101 for biomass fuels or any other suitable fuels.

It was previously believed that temperatures as low as about 360° F. were too low for effective SCR reduction of $NO_X$ and catalytic oxidation of CO/VOC. However, it was discovered in conjunction with the present invention that temperatures as low as about 360° F. can be effective given the proper conditions. One key to the high performance of system 100 is a flue gas that is well mixed with ammonia for the SCR, uniform distribution of the flue gas into the catalyst beds, and sufficient temperature for the reaction to efficiently occur. Another key to system 100 is first understanding of the correct operating temperature window for the catalytic reactor, and then matching the other components to this operating point. System 100 can enable maximum recovery of energy from the flue gas while enabling the catalytic reactor to operate at the correct temperature.

With reference again to FIG. 1, the following is a description of a method of treating flue gas to reduce air pollution in accordance with the present invention. The method includes introducing air into the heat exchanger of first air heater 110 by way of forced draft fan 126 and overfire air fan 124. The heat exchanger of first air heater 110 transfers heat between flue gas and air, as described above. The air introduced into the heat exchanger of first air heater 110 is heated by emission treated flue gas introduced into the heat exchanger of first air heater 110.

Air from the heat exchanger of first air heater 110 is introduced into the heat exchanger of second air heater 112, which maintains separate air circuits 104 and 106 for over fire air and undergrate air, respectively, for introducing air to an overfire air manifold and an undergrate air manifold of boiler 102, for example. The heat exchanger of second air heater 112 transfers heat between flue gas and air in circuits 104 and 106, heating the air and cooling flue gas from boiler 102, while maintaining separate air circuits as described above. The air is thus preheated by both air heaters 110 and 112 prior to introduction into boiler 102. Overfire air from second air circuit 104 is introduced to boiler 102 over the fire, and undergrate air from first air circuit 106 is introduced under the grate. Since separate air circuits are maintained for undergrate air and overfire air, the flow rates for each circuit can be controlled independent of the other as needed.

Fuel 108 is introduced into boiler 102 along with air from circuits 104 and/or 106 for combustion. The heated combustion products can be used for power production by any suitable means such as boiler tubes in a steam circuit. The combustion products leave boiler 102 as flue gas, which is introduced to the heat exchanger of second air heater 112, where the flue gas is cooled while heating the incoming air as described above, which provides a first stage of heat recovery from the flue gas. The flue gas is sufficiently cooled in second air heater 112 that the flue gas can be safely introduced to emission treatment system 101 for reducing at least one pollutant from the flue gas, as already described above, however the flue gas is not cooled completely. Rather, some heat is allowed to remain for use in the SCR process. After passing through the components of emission treatment system 101, emission treated flue gas is introduced into the heat exchanger of first air heater 110, where a second stage of heat is recovered from the flue gas as it heats incoming air, as described above. Cooled emission treated flue gas is discharged from the heat exchanger of first air heater 110 to be released through stack 128.

The split air heater and method described above and shown in FIG. 1 allow for catalytic reduction of multiple pollutants while also enabling enhanced thermal efficiency by way of preheating air and heat recovery from flue gas. The steps described above can all be performed continuously with flow through system 100 in a single direction without the need to reverse flow across heat recovery media as in previously known systems, simplifying operation and maintenance and reducing the fan power requirements, pressure drop in the SCR components, and capital cost.

Those skilled in the art will readily appreciate that the temperatures provided herein are given as non-limiting examples, and that in practice the various system temperatures can vary with fuel and application. Any suitable system temperatures can be used without departing from the spirit and scope of the invention. Temperature control can be achieved by completely or partially bypassing first and/or second air heaters 110 and 112 as needed to maintain acceptable temperatures in emission treatment system 101.

Those skilled in the art will readily appreciate that the configuration and methods described above allow for selective catalytic reduction of $NO_X$ and other pollutants without requiring auxiliary heat input. However, if the incoming temperature for emission treatment system 101 is low enough to allow proper operation of components such as dust collection system 114, induced draft fan 116, and/or electrostatic precipitator 118, but too low for MPCR 120, it is possible to add some heat the flue gas prior to entering MPCR 120 after exiting the other components. Heat added at this point can be largely or entirely recovered in first air heater 110. This can allow flexibility for particular applications in which various specific components having different temperature requirements are included in emission treatment system 101.

The systems and methods described above employ a novel air heater, which is a split air heater configuration including first and second air heaters 110 and 112. The split air heater configuration separates the air heater into two air heater units, each of which handles a portion of the overall heat transfer duty of a conventional air heater unit. Each of the air heaters 110 and 112 is configured to apportion a desired amount of the heat transfer from the flue gas stream into the air streams destined for the undergrate air manifolds or the overfire air manifolds as described above. This split air heater configuration allows for elimination of auxiliary heat input to the SCR system and reduces pressure drop through the SCR system. While system 100 has been described above with two separate air circuits 104 and 106, for example, those skilled in the art will readily appreciate that one single air circuit can be used, or any other suitable number of air circuits for a specific application can be used without departing from the spirit and scope of the subject invention.

System 100 uses separate overfire air and forced draft (undergrate air) fans which draw ambient temperature air and preheat the air by means of separate gas circuits to air heat exchangers. The split air heater arrangement preheats the overfire air and undergrate air streams in separate zones of common gas to air heat exchangers. This results in a more efficient heat exchange. System 100 also is more cost efficient than previously known systems at least in part because system 100 eliminates the pressure drop through regenerative thermal media typical in previously known systems, such as in RSCR systems.

The devices and methods described above provide numerous advantages over typical RSCR systems and over conventional 'tail-end' SCR systems, including lower net plant heat rate, improved boiler efficiency, reduced capital costs, simultaneous $NO_X$ reduction and CO/VOC oxidation, greater $NO_X$ reduction, very low ammonia slip, typically >50% CO oxidation, modular system components, and flexibility in plant layout to accommodate site constraints, to list some examples. The advantages of system 100 when used in conjunction with a stoker unit compared to other stoker units or to bubbling/fluidized bed boilers include lower heat rate, very low emissions of PM, $NO_X$, NH3 slip, HCl, and CO, high efficiency in fuel utilization, fuel flexibility, higher availability, and comparatively low cost.

While the apparatus and methods of the subject invention have been shown and described with reference to preferred embodiments, those skilled in the art will readily appreciate that changes and/or modifications may be made thereto without departing from the spirit and scope of the subject invention.

What is claimed is:
1. An air pollution control system comprising:
 a) an emission treatment system configured to receive flue gas, to reduce at least one pollutant therefrom to convert flue gas into emission treated flue gas;
 b) a first air heater in fluid communication with the emission treatment system and including a heat exchanger configured to heat forced air introduced thereto above a base temperature and to thereby cool emission treated flue gas from the emission treatment system introduced to the heat exchanger of the first air heater to a stack discharge temperature; and
 c) a second air heater in fluid communication with the first air heater to receive heated forced air therefrom, the second air heater including a heat exchanger configured to heat forced air introduced thereto to a preheat temperature for combustion in a boiler and to thereby cool flue gas introduced from a boiler to the heat exchanger of the second air heater to an emission treatment temperature, the second air heater being in fluid communication with the emission treatment system to introduce cooled flue gas thereto, wherein the emission treatment system includes at least one component selected from the group consisting of a selective catalytic reduction system configured and adapted to reduce $NO_X$ from flue gas in the emission treatment system, a catalytic CO control system for oxidizing CO from flue gas in the emission treatment system, and a catalytic VOC control system for oxidizing VOC from flue gas in the emission treatment system.

2. A air pollution control system as recited in claim 1, wherein a first air circuit is defined through the first and second air heaters for supplying preheated undergrate air to a boiler, and wherein a second air circuit is defined through the first and second air heaters for supplying preheated overfire air to a boiler.

3. An air pollution control system as recited in claim 2, wherein the first air circuit includes a forced draft fan in fluid communication with the first air heater for forcing air through the first air circuit to a boiler, and wherein the second air circuit includes an overfire air fan in fluid communication with the first air heater for forcing air through the second air circuit to a boiler.

4. An air pollution control system as recited in claim 1, wherein the emission treatment system includes a component for reducing particulate matter from flue gas in the emission treatment system selected from the group consisting of an electrostatic precipitator and a fabric filter.

5. An air pollution control system as recited in claim 1, wherein the emission treatment system includes a multi-pollutant catalytic reactor configured to reduce multiple pollutants from flue gas in the emission treatment system.

6. An air pollution control system as recited in claim 1, wherein the first air heater is configured and adapted to cool flue gas entering at a temperature in a range of about 360° F. to about 500° F. to a temperature in a range of about 280° F. to about 350° F.

7. An air pollution control system as recited in claim 6, wherein the first air heater is configured to cool flue gas to a temperature of about 320° F.

8. An air pollution control system as recited in claim 1, wherein the second air heater is configured to cool flue gas entering at a temperature in a range of about 550° F. to about 650° F. to a temperature in a range of about 360° F. to about 500° F.

9. An air pollution control system as recited in claim 8, wherein the second air heater is configured to cool flue gas to a temperature of about 450° F.

10. An air pollution control system as recited in claim 1, wherein the first air heater is configured to heat air entering at a temperature in a range of about 60° F. to about 100° F. to a temperature in a range of about 250° F. to about 300° F.

11. An air pollution control system as recited in claim 10, wherein the second air heater is configured to heat air entering at a temperature in a range of about 250° F. to about 300° F. to a temperature in a range of about 475° F. to about 550° F.

12. An air pollution control system comprising:
a) an emission treatment system configured to reduce at least one pollutant from flue gas received into the emission treatment system at a temperature in a range of about 360° F. to about 500° F. and to output emission treated flue gas from the emission treatment system at a temperature in a range of about 360° F. to about 500° F., wherein the emission treatment system includes at least one component selected from the group consisting of a selective catalytic reduction system configured and adapted to reduce $NO_X$ from flue gas in the emission treatment system, a catalytic CO control system for oxidizing CO from flue gas in the emission treatment system, and a catalytic VOC control system for oxidizing VOC from flue gas in the emission treatment system.

13. An air pollution control system as recited in claim 12, wherein the emission treatment system includes a component for reducing particulate matter from flue gas in the emission treatment system selected from the group consisting of an electrostatic precipitator and a fabric filter.

14. An air pollution control system as recited in claim 12, wherein the emission treatment system includes a multi-pollutant catalytic reactor configured to reduce multiple pollutants from flue gas in the emission treatment system.

15. An air pollution control system as recited in claim 14, wherein the emission treatment system includes a dust collection system upstream of the multi-pollutant catalytic reactor, the dust collection system being configured and adapted to reduce dust from flue gas flowing to the multi-pollutant catalytic reactor.

16. An air pollution control system as recited in claim 14, wherein the emission treatment system includes a component upstream of the multi-pollutant catalytic reactor for reducing particulate matter from flue gas flowing to the multi-pollutant catalytic reactor, wherein the component is selected from the group consisting of an electrostatic precipitator and a fabric filter.

17. An air pollution control system as recited in claim 14, further comprising an ammonia injection system configured to inject ammonia into flue gas flowing through the emission treatment system for $NO_X$ reduction in the multi-pollutant catalytic reactor.

18. An air pollution control system comprising:
an emission treatment system configured to reduce at least one pollutant from flue gas received into the emission treatment system at a temperature in a range of about 360° F. to about 500° F. and to output emission treated flue gas from the emission treatment system at a temperature in a range of about 360° F. to about 500° F., wherein the emission treatment system includes a multi-pollutant catalytic reactor configured to reduce multiple pollutants from flue gas in the emission treatment system, and wherein the multi-pollutant is of at least one type selected from the group consisting of a multi-pollutant catalytic reactor configured to reduce $NO_X$ and oxidize CO from flue gas introduced thereto at a temperature in a range of about 360° F. to about 500° F., a multi-pollutant catalytic reactor configured to reduce $NO_X$ and oxidize CO from flue gas at a temperature in a range of about 400° F. to about 450° F., and a multi-pollutant catalytic reactor including a $NO_X$ reducing catalyst upstream from a CO oxidizing catalyst.

19. A method of treating flue gas to reduce air pollution comprising:
a) introducing air into a heat exchanger of a first air heater, wherein the heat exchanger of the first air heater is configured to transfer heat between flue gas and air;
b) heating the air introduced into the heat exchanger of the first air heater by cooling emission treated flue gas introduced into the heat exchanger of the first air heater;
c) introducing air from the heat exchanger of the first air heater into a heat exchanger of a second air heater, wherein the heat exchanger of the second air heater is configured to transfer heat between flue gas and air;
d) heating the air introduced into the heat exchanger of the second air heater by cooling flue gas from a boiler introduced into the heat exchanger of the second air heater;
e) introducing cooled flue gas from the heat exchanger of the second air heater to an emission treatment system;
f) reducing at least one pollutant from flue gas introduced into the emission treatment system from the second air heater, wherein the step of reducing includes at least one step selected from the group consisting of:
i) reducing $NO_X$ from flue gas passing through the emission treatment system, wherein the step of reducing $NO_X$ includes passing flue gas through a selective catalytic reduction system, ii) oxidizing CO from flue gas passing through the emission treatment system, wherein the step of oxidizing CO includes passing flue gas through a catalytic CO control system, and iii) oxidizing VOC from flue gas passing through the emission treatment system, wherein the step of oxidizing VOC includes passing flue gas through a catalytic VOC control system;

g) introducing emission treated flue gas from the emission treatment system into the heat exchanger of the first air heater; and h) discharging cooled emission treated flue gas from the heat exchanger of the first air heater.

20. A method of treating flue gas as recited in claim 19, wherein the steps of introducing air, heating air, introducing cooled flue gas, reducing at least one pollutant, introducing emission treated flue gas, and discharging cooled emission treated flue gas are all performed continuously.

21. A method of treating flue gas as recited in claim 19, further comprising:
a) introducing heated air from the heat exchanger of the second air heater into a boiler for combustion; and
b) introducing flue gas from the boiler into the heat exchanger of the second air heater.

22. A method of treating flue gas as recited in claim 19, wherein the step of introducing air into the heat exchanger of the first air heater includes introducing air from a first fan into a first air circuit and introducing air from a second fan into a second air circuit, and wherein the step of heating the air introduced into the first air heater includes heating air in the first and second air circuits separately.

23. A method of treating flue gas as recited in claim 22, wherein the step of introducing air into the heat exchanger of the second air heater includes introducing air from the first and second air circuits separately, and wherein the step of heating the air introduced into the second air heater includes heating air in the first and second air circuits separately.

24. A method of treating flue gas as recited in claim 23, further comprising introducing air in the first and second air circuits separately from the second heat exchanger into a boiler.

25. A method of treating flue gas as recited in claim 19, further comprising reducing dust content from flue gas in the emission treatment system.

26. A method of treating flue gas as recited in claim 19, further comprising reducing particulate matter content from flue gas passing through the emission treatment system, wherein the step of reducing particulate matter content includes passing flue gas through a component for reducing particulate matter from flue gas in the emission treatment system selected from the group consisting of an electrostatic precipitator and a fabric filter.

27. A method of treating flue gas as recited in claim 19, further comprising reducing multiple pollutants from flue gas passing through the emission treatment system, wherein the step of reducing multiple pollutants includes passing flue gas through a multi-pollutant catalytic reactor.

28. A method of treating flue gas as recited in claim 19, wherein the step of heating air introduced into the first air heater includes cooling flue gas entering the heat exchanger of the first air heater at a temperature in a range of about 360° F. to about 500° F. to a temperature in a range of about 280° F. to about 350° F.

29. A method of treating flue gas as recited in claim 28, wherein the step of cooling flue gas entering the heat exchanger of the first air heater includes cooling the flue gas to a temperature of about 320° F.

30. A method of treating flue gas as recited in claim 19, wherein the step of heating air introduced into the second air heater includes cooling flue gas entering the heat exchanger of the second air heater at a temperature in a range of about 550° F. to about 650° F. to a temperature in a range of about 360° F. to about 500° F.

31. A method of treating flue gas as recited in claim 30, wherein the step of cooling flue gas entering the heat exchanger of the second air heater includes cooling the flue gas to a temperature of about 450° F.

32. A method of treating flue gas as recited in claim 19, wherein the step of heating the air introduced into the first air heater includes heating air entering the heat exchanger of the first air heater at a temperature in a range of about 60° F. to about 100° F. to a temperature in a range of about 250° F. to about 300° F.

33. A method of treating flue gas as recited in claim 19, wherein the step of heating the air introduced into the second air heater includes heating air entering the heat exchanger of the second air heater at a temperature in a range of about 250° F. to about 300° F. to a temperature in a range of about 475° F. to about 550° F.

34. A method of treating flue gas to reduce air pollution comprising;
a) introducing air into a heat exchanger of a first air heater, wherein the heat exchanger of the first air heater is configured to transfer heat between flue gas and air;
b) heating the air introduced into the heat exchanger of the first air heater by cooling emission treated flue gas introduced into the heat exchanger of the first air heater;
c) introducing air from the heat exchanger of the first air heater into a heat exchanger of a second air heater, wherein the heat exchanger of the second air heater is configured to transfer heat between flue gas and air;
d) heating the air introduced into the heat exchanger of the second air heater by cooling flue gas from a boiler introduced into the heat exchanger of the second air heater;
e) introducing cooled flue gas from the heat exchanger of the second air heater to an emission treatment system;
f) reducing at least one pollutant from flue gas introduced into the emission treatment system from the second air heater;
g) introducing emission treated flue gas from the emission treatment system into the heat exchanger of the first air heater; and
h) discharging cooled emission treated flue gas from the heat exchanger of the first air heater, wherein the step of reducing at least one pollutant includes introducing flue gas into the emission treatment system at a temperature in a range of about 360° F. to about 500° F. and discharging emission treated flue gas from the emission treatment system at a temperature in a range of about 360° F. to about 500° F., wherein the emission treatment system includes a multi-pollutant catalytic reactor configured to reduce multiple pollutants from flue gas in the emission treatment system, wherein the step of reducing at least one pollutant includes reducing $NO_X$ and oxidizing CO from a flue gas flow entering the multi-pollutant catalytic reactor at a temperature in a range of about 360° F. to about 500° F.

35. A method of treating flue gas as recited in claim 34, wherein the step of reducing at least one pollutant includes reducing $NO_X$ and oxidizing CO from a flue gas flow entering the multi-pollutant catalytic reactor at a temperature in a range of about 400° F. to about 450° F.

* * * * *